United States Patent
Swartling et al.

(10) Patent No.: US 8,478,505 B2
(45) Date of Patent: Jul. 2, 2013

(54) METHOD OF CONTROLLING A VTG ENGINE

(75) Inventors: Fredrik Swartling, Södertälje (SE); Mikael Hanson, Årsta (SE); Mikael Persson, Södertälje (SE); Mats Jennische, Stockholm (SE)

(73) Assignee: Scania CV AB (Publ) (SE)

( * ) Notice: Subject to any disclaimer, the term of this patent is extended or adjusted under 35 U.S.C. 154(b) by 695 days.

(21) Appl. No.: 12/599,739

(22) PCT Filed: May 6, 2008

(86) PCT No.: PCT/SE2008/050515
§ 371 (c)(1),
(2), (4) Date: Dec. 2, 2009

(87) PCT Pub. No.: WO2008/140401
PCT Pub. Date: Nov. 20, 2008

(65) Prior Publication Data
US 2010/0131159 A1    May 27, 2010

(30) Foreign Application Priority Data
May 16, 2007   (SE) ...................... 0701205

(51) Int. Cl.
*G06F 19/00*   (2011.01)
(52) U.S. Cl.
USPC .......................................... 701/100

(58) Field of Classification Search
USPC .............. 701/51, 53, 54, 95, 100, 101, 102
See application file for complete search history.

(56) References Cited

U.S. PATENT DOCUMENTS

| | | | |
|---|---|---|---|
| 4,685,302 A * | 8/1987 | Abo et al. ................. | 60/602 |
| 6,020,652 A | 2/2000 | Daudel et al. | |
| 6,058,707 A * | 5/2000 | Bischoff .................. | 60/602 |
| 6,089,018 A | 7/2000 | Bischoff et al. | |
| 2005/0153815 A1 * | 7/2005 | Janssen ..................... | 477/62 |
| 2010/0198479 A1 * | 8/2010 | Swartling et al. .......... | 701/100 |

FOREIGN PATENT DOCUMENTS

| | | |
|---|---|---|
| JP | 10331650 A | 12/1998 |
| WO | WO 03/018974 | 3/2003 |
| WO | WO 2004/094176 A1 | 11/2004 |

OTHER PUBLICATIONS

International Search Report dated Jul. 3, 2008, issued in corresponding international application No. PCT/SE2008/050515.

\* cited by examiner

*Primary Examiner* — Kim T Nguyen
(74) *Attorney, Agent, or Firm* — Ostrolenk Faber LLP

(57) ABSTRACT

When controlling an engine provided with Variable Turbine Geometry (VTG), the VTG is closed to a maximally acceptable closed position without endangering the VTG when performing an up-shift. The VTG is kept in such a position during the gear shift which, allows for a quick retardation of the engine speed.

15 Claims, 3 Drawing Sheets

METHOD OF CONTROLLING A VTG ENGINE

CROSS REFERENCE TO RELATED APPLICATIONS

The present application is a 35 U.S.C. §371 national phase conversion of PCT/SE2008/050515 filed May 6, 2008, which claims priority of Swedish Application No. 0701205-7 filed May 16, 2007, which are herein incorporated by reference. The PCT International Application was published in the English language.

TECHNICAL FIELD

The present invention relates to a method and a system for controlling a combustion engine for propelling a motor vehicle. In particular the present invention relates to a method and apparatus for controlling a motor vehicle equipped with an engine employing Variable Turbine Geometry (VTG) Technology.

BACKGROUND

An engine used in trucks can be provided with a Variable Turbine Geometry (VTG) also termed Variable Geometry Turbocharger or Variable Geometry Turbine (VGT). One reason for employing VTG technology is that it facilitates fulfillment of emission requirements for i.a. diesel engines.

As is the case for all gear shifting there is a desire to minimize the time required to carry out the gear shift. This is because during gear shift there should not be any torque on the drive line. Gear shifting is also described in the international patent application having the international publication number WO 03/018974. Furthermore, in the U.S. Pat. No. 6,089,018 a method of controlling a VTG during gear shift is described.

Hence, there exist a need for a method and a system that is capable of providing a quick gear shift.

SUMMARY

It is an object of the present invention to provide a method and a system that is capable providing a quick gear shift.

It is another object of the present invention to provide a method and a system that is capable of providing a quick retardation of the engine speed during gear shift.

These objects and others are obtained by the method, system and computer program product as set out in the appended claims. Thus, closing the VTG to a maximally acceptable closed position and keeping the VTG in such a position during the gear shift will allow a quick retardation of the engine speed.

In order to obtain a quick deceleration of the engine speed when up-shifting, the VTG can be set to act as an engine braking device. Hence, by creating a high exhaust gas pressure upstream the VTG turbine that pressure will increase the pumping losses of the engine hence striving to decelerate the engine speed. In such an operation the more closed the VTG, the more pump losses will have to be overcome by the engine and as a result the engine speed will decelerate quicker. However, the VTG can only sustain a certain pressure drop. Hence, the pressure difference over the VTG can not be allowed to exceed an inherent value particular to each type of VTG.

Knowing the maximally allowed pressure difference over the VTG and controlling the VTG to be as closed as possible without exceeding the maximally allowed pressure, the VTG will act to decelerate the engine speed as quickly as possible without endangering the VTG. The result of such a control strategy is a very fast deceleration of the engine speed and as a consequence the gear shift can be made quicker.

In one embodiment, the control system is adapted to determining the effective flow area for the Variable Turbine Geometry, and to determining the maximally allowed closed position for the Variable Turbine Geometry from the determined effective flow area of the Variable Turbine Geometry. Hereby a fast calculation of the optimal VTG position can be obtained whereby the control method can be made fast and accurate.

In one embodiment the control system has access to a stored map of Variable Turbine Geometry positions for different effective flow areas whereby the maximally closed Variable Turbine Geometry position directly can be determined to be the position corresponding to the effective flow area of the map, which even further speeds up the time required for finding the optimal VTG position.

In one embodiment the control system is adapted to repeatedly update the maximally allowed closed position for the Variable Turbine Geometry during the gear shift. Hereby it is assured that the optimal closed position is applied for the entire time period when gear shift is in progress. Also it is ensured that the VTG is closed to a position where the VTG is not endangered.

In one embodiment the VTG is closed some time period before a gear shift is performed. This is advantageous because when the gear shift begins the engine breaking is already maximized and full engine brake can be obtained during the entire gear shift operation.

In another embodiment the engine breaking properties of a VTG are combined with a conventional exhaust gas engine breaking device, such as an exhaust break.

BRIEF DESCRIPTION OF THE DRAWINGS

The present invention will now be described in more detail by way of non-limiting examples and with reference to the accompanying drawings, in which.

DETAILED DESCRIPTION

Figure 1A:
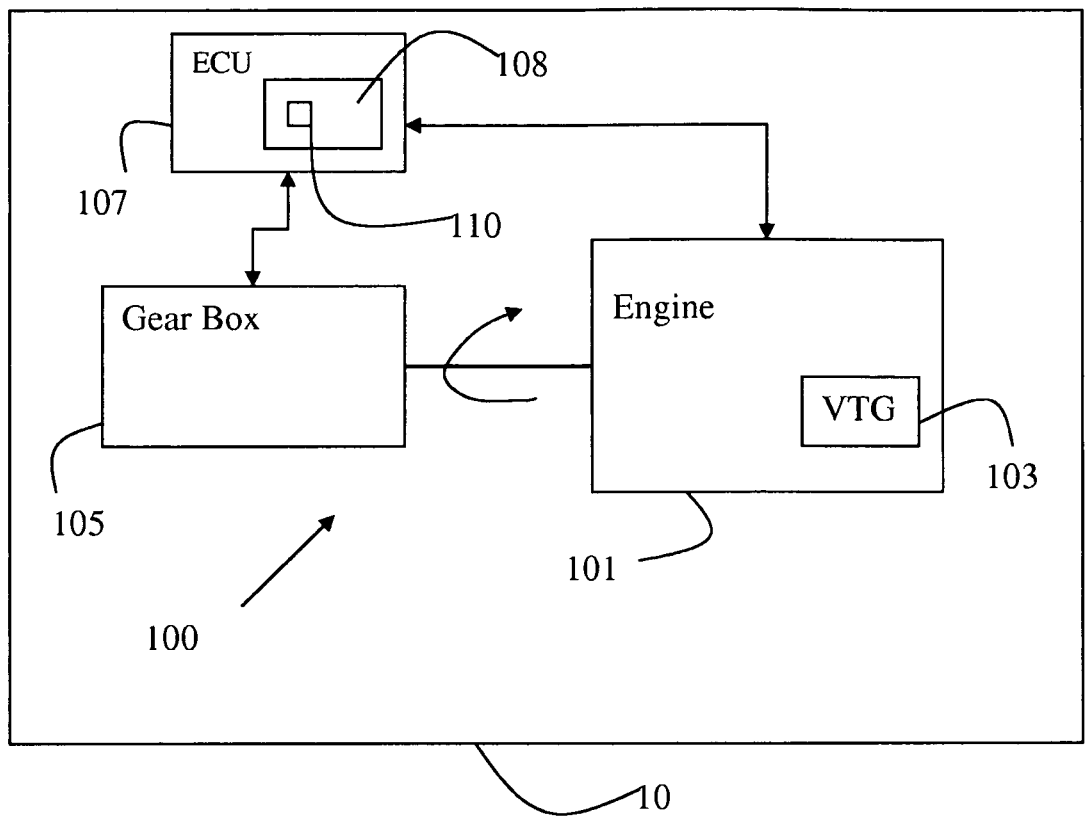
FIG. 1a is a general partial view of a drive line comprising an engine including a turbo charger with VTG.

In FIG. 1a selected parts of a drive line 100 of a motor vehicle 10 are schematically depicted. The drive line depicted in FIG. 1 can for example be designed to be part of a truck or any other heavy vehicle such as a bus or the like. The drive line 100 comprises an engine 101, e.g. in the form of diesel engine. The engine 101 comprises a turbocharger driven by a turbine having a Variable Turbine Geometry VTG 103. The engine is further connected to a gear box 105, for example a gear box adapted for automatic gear shift. The vehicle 10 can also be provided with an exhaust break, as is shown in FIG. 1b.

The engine 101 and the gearbox 105 are controlled by at least one control unit 107, such as an electronic control unit (ECU). The control unit is adapted to receive sensor signals from different parts of the vehicle, including, but not limited to, signals used for controlling the gearbox and the engine. The control unit 107 is also adapted to provide control signals to different parts and components of the vehicle such as for example the engine and the gear box.

The control of the different parts and components of the vehicle is governed by pre-programmed instructions stored in the control unit. The pre-programmed instructions typically are in the form of a computer program executed by the control unit. By changing the instructions the vehicle can be made to behave differently in a particular situation. Typically, the programmed computer instructions are provided in the form of a computer program product 110 stored on a readable digital storage medium 108, such as memory card, a Read Only Memory (ROM) a Random Access Memory (RAM), an EPROM, an EEPROM or a flash memory.

Figure 1B:
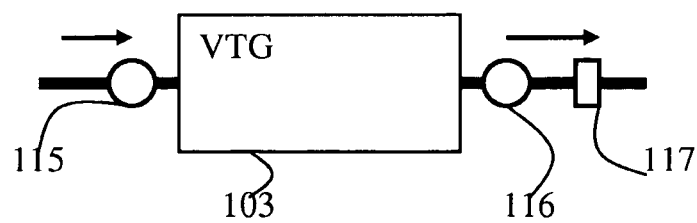
FIG. 1b is a view illustrating the exhaust gas flow of the engine in FIG. 1a in more detail.

In FIG. 1b the exhaust gas flow of the engine depicted in FIG. 1a is shown in more detail, where the arrows indicate the exhaust gas flow direction. Thus, downstream the engine the VTG 103 is located. Upstream the VTG, e.g. at the beginning of the exhaust gas system, a first pressure sensor 115 is located. A second pressure sensor 116 is located downstream the VTG 103. In addition there may be an exhaust gas break 117 provided further downstream the second pressure sensor 116.

Figure 2:
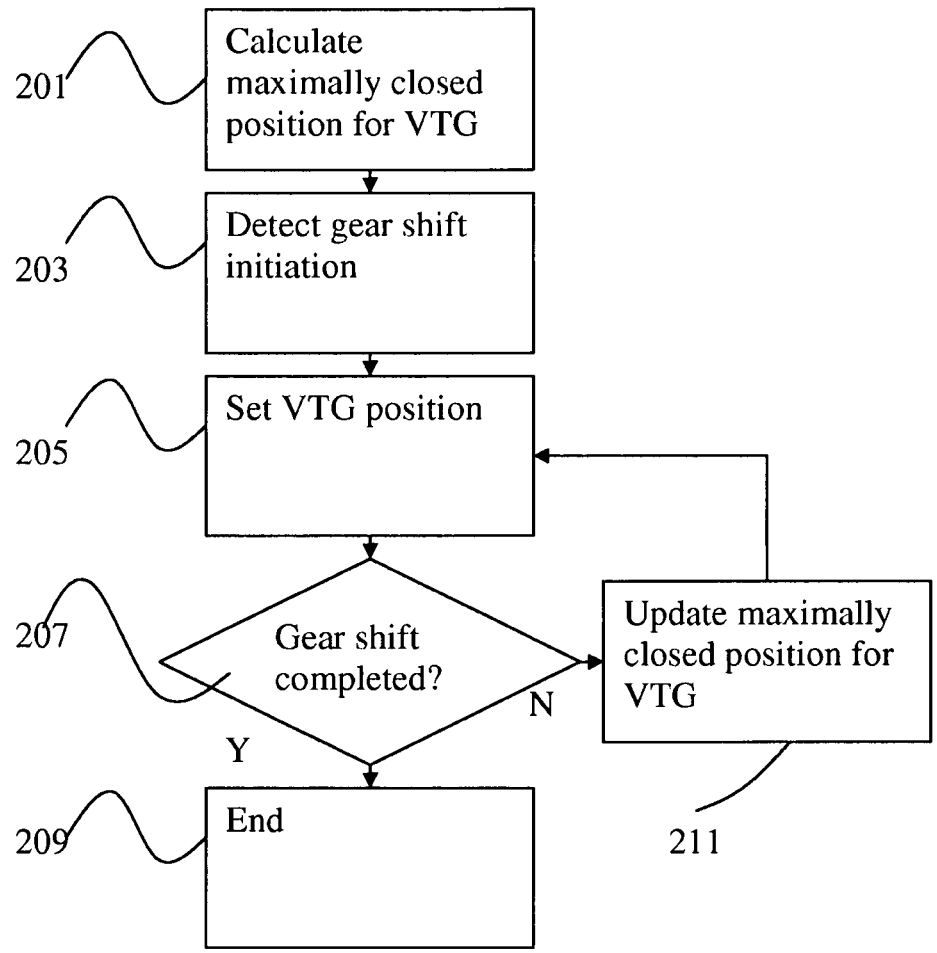
FIG. 2 is a flowchart illustrating steps performed when controlling an engine with VTG used for propelling a motor vehicle in accordance with a first embodiment.

In FIG. 2, a flowchart illustrating some procedural steps performed when controlling an engine with VTG of a motor vehicle in accordance with one embodiment of the present invention is shown. Thus, in a first step 201, the control unit calculates the maximally allowed closed position for the VTG using the current readings from the pressure sensors before and after the VTG.

The pressure downstream the turbine can also be approximated with the outside pressure or, for example, using the model below for the pressure drop in the exhaust system.

$$p_{at} = \frac{p_{atm}}{2} + \sqrt{\frac{p_{atm}^2}{4} + K_{res} R T_{em} \dot{m}_t^2}$$

The closed VTG position can for example be calculated using the following prediction calculations:

$$\dot{m}_t = A_t \frac{p_{bt}}{\sqrt{T_{em} R}} \Psi\left(\frac{p_{at}}{p_{bt}}, \gamma_e\right) \quad (1)$$

where $A_t = A_r * C_d$ $\gamma_e = c_P / c_v$ $$\Psi\left(\frac{p_{at}}{p_{bt}}, \gamma_e\right) = \quad (2)$$

$$\begin{cases} \sqrt{\frac{2\gamma_e}{\gamma_e}\left(\left(\frac{p_{at}}{p_{bt}}\right)^{\frac{2}{\gamma_e}} - \left(\frac{p_{at}}{p_{bt}}\right)^{\frac{\gamma_e+1}{\gamma_e}}\right)} & \text{if } \frac{p_{at}}{p_{bt}} \geq \left(\frac{2}{\gamma_e+1}\right)^{\frac{\gamma_e}{\gamma_e-1}} \\ \sqrt{\gamma_e\left(\frac{2}{\gamma_e+1}\right)^{\frac{\gamma_e+1}{\gamma_e-1}}} & \text{else} \end{cases}$$

Solving equation (1) for $A_t$ gives $A_t$ as a function of the following variables.

$$A_t = f(\dot{m}_e, T_{em}, p_{bt}, p_{at}) \quad (3)$$

Using reference values for the pressure values, and measured values for mass flow and exhaust gas temperature, equation (3) gives the effective flow area for the VTG that corresponds to the desired pressure drop over the turbine. Since the effective flow area is a function of VTG position, VTG positions that correspond to a certain effective flow area are stored in a map (f2) in the ECU.

$$VTG\ Position = f_2(A_t)$$

DESCRIPTION OF VARIABLES $\dot{m}_t$=massflow through turbine
$A_t$=effective flow area turbine
$A_r$=Cross sectional area of flow path
$C_d$=Flow coefficient
$K_{res}$=Tunable model parameter
$T_{em}$=temperature of exhaust gas
$p_{atm}$=atmospheric pressure
$p_{at}$=pressure after turbine
$p_{bt}$=pressure before turbine
$c_p$=Specific heat capacity at const. pressure
$c_v$=Specific heat capacity at const. volume
R=Ideal gas const The calculations performed in step 201 are continuously renewed so that the control unit at all times has access to an updated prediction value for the closed VTG position. When a gear shift is to be performed and the present gear is disengaged it is desired to quickly reduce the engine speed to a speed synchronized with the next gear after which the next gear can be engaged. A high exhaust gas pressure will contribute to reduce the engine speed quicker and hence reduce the time necessary to wait before the next gear can be engaged. Therefore it is beneficial to apply a high exhaust gas pressure when a gear shift is to take place.

Thus, when a gear shift is initiated in a second step 203 this event is signaled to the control unit. The signal can for example be a trigger signal from another control unit controlling the gear box, which upon initiating a gear shift also signals to the control unit controlling the VTG position. The control unit has access to data relating to the currently maximum closed VTG position and can emit a control signal setting the VTG to the corresponding position thereby maximizing the exhaust gas pressure in a third step 205. Thereupon, the procedure checks if the gear shift has been completed in a fourth step 207. If the gear shift has been completed the procedure ends in a fifth step 209 and the control of the VTG is performed according to whatever control strategy the control unit is programmed to execute.

If, on the other hand, the gear shift has not been completed in step 207, the procedure continues to a sixth step 211, where the VTG calculations as described above are updated so that the VTG can continue to be controlled to the maximum closed position. The procedure then returns to step 205 where the VTG is again set to a position corresponding to the result of the VTG calculations.

In FIG. 3a flowchart illustrating some procedural steps performed when controlling the VTG of a vehicle in accordance with another embodiment of the present invention is shown.

Figure 3:
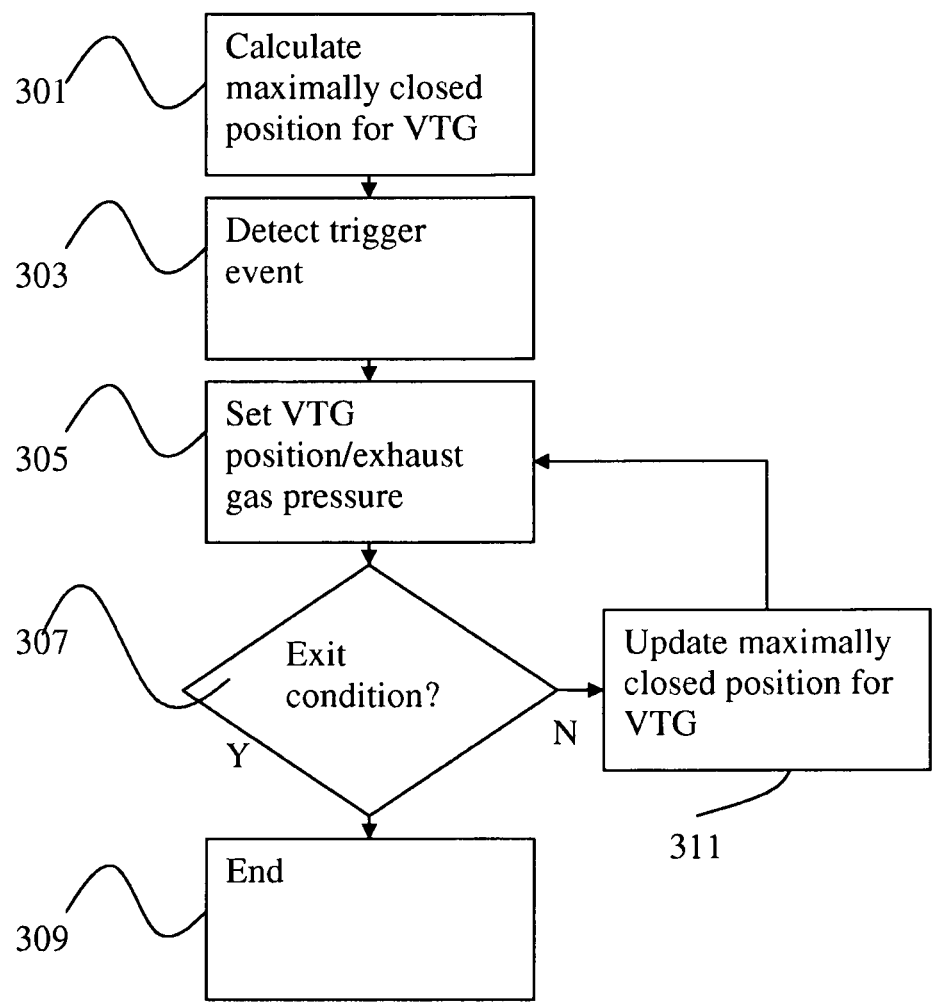
FIG. 3 is a flowchart illustrating steps performed when controlling an engine VTG used for propelling a motor vehicle in accordance with a second embodiment.

Because it is desired that the exhaust gas pressure is as high as possible during the gear shift phase and building a high exhaust gas pressure takes time, it can be advantageous to start building a high exhaust gas pressure before the actual gear shift is initiated. Such a control procedure is shown in FIG. 3.

Thus, in a first step 301, the control unit calculates the maximally allowed closed position for the VTG using the current readings from the pressure sensors upstream and downstream the VTG. The pressure after the turbine can also be approximated with the outside pressure or some other approximation.

The closed VTG position can for example be calculated using the calculations as set out above in conjunction with FIG. 2. The calculations performed in step 301 are continuously renewed so that the control unit at all times has access to an updated prediction value for the closed VTG position. When a gear shift is to be performed and the present gear is disengaged it is desired to quickly reduce the engine speed to a speed synchronized with the next gear after which the next gear can be engaged. A high exhaust gas pressure will contribute to reduce the engine speed quicker and hence reduce the time necessary to wait before the next gear can be engaged. Therefore it is beneficial to apply a high exhaust gas pressure just before a gear shift is to take place so that a high exhaust gas pressure can be generated and applied immediately when a gear shift begins.

Thus, when an event making it likely that a gear shift will take place in the near future occurs in a second step 303, the control unit has access to data relating to the currently maximum closed VTG position and can emit a control signal setting the VTG to the corresponding position thereby maximizing the exhaust gas pressure in a third step 305. In another embodiment instead of open control of the VTG position, a closed loop control of the exhaust gas pressure can be employed. Hence, instead of closing the VTG to the predicted position, the exhaust gas pressure is controlled to a maximum pressure that the VTG is estimated to sustain without suffering any damage in order to ensure that the VTG is not damaged.

The event triggering closing of the VTG can for example be a reduced torque demand or any other event signaling that a gear shift is likely to occur in the near future.

Thereupon, the procedure checks if the gear shift has been completed in a fourth step 307. Also if the closing of the VTG was triggered and no gear shift was performed step 307 also times the time between the trigger event and actual gear shift initiation. If there is no gear shift for some predetermined period of time a timer in step 307 times out. If the gear shift has been completed or the timer in step 307 times out, the procedure ends in a fifth step 309 and the control of the VTG is performed according to whatever control strategy the control unit is programmed to execute.

If, on the other hand, the gear shift has not been completed and the timer has not timed out in step 307, the procedure continues to a sixth step 311, where the VTG calculations as described above are updated so that the VTG can continue to be controlled to the maximum closed position. The procedure then returns to step 305 where the VTG is again set to a position corresponding to the result of the VTG calculations.

Furthermore, because it is likely that the power demand from the engine will be high after completing a gear shift, keeping the exhaust gas pressure high for some time period after completion of a gear shift can be advantageous. Thus, by keeping the VTG closed for some time after completing a gear shift will maintain a high exhaust gas pressure before the turbine which can be used to power the turbo charger and thereby increase the power generated by the engine immediately after a gear shift.

The methods of providing quick engine retardation in conjunction with a gear shift as described herein can also be combined with a conventional exhaust break if this turns out to be advantageous in some applications.

Using the VTG to obtain a quick retardation of the engine speed is advantageous for a number of different reasons. There is for example little noise associated with building a high exhaust gas pressure. The VTG is further relatively easy to control. In addition a high exhaust gas pressure before the turbine enables a high power to the turbo compressor.

The invention claimed is:

1. A method of controlling an internal combustion engine that includes a turbo charger with a Variable Turbine Geometry for powering a motor vehicle that is provided with a gear box the method comprising:
   determining an effective flow area for the Variable Turbine Geometry;
   determining a maximally allowed closed position for the Variable Turbine Geometry from the determined effective flow area of the Variable Turbine Geometry;
   detecting that a shifting of a gear of the motor vehicle is initiated; and
   controlling the Variable Turbine Geometry to the maximally allowed closed position when the shifting of the gear is detected.

2. The method according to claim 1, further comprising:
   storing a map of Variable Turbine Geometry positions, wherein the Variable Turbine Geometry positions have flow areas of varying effectiveness,
   determining the maximally closed Variable Turbine Geometry position to a position in the map that corresponds to a particular effective flow area.

3. The method according to claim 1, further comprising:
   subsequently determining a different maximally allowed closed position for the Variable Turbine Geometry during the shifting of the gear.

4. The method according to claim 3, wherein the subsequent determining of a different maximally allowed closed position for the Variable Turbine Geometry occurs repeatedly.

5. The method according to claim 1, wherein the shifting of the gear is an up-gear shift.

6. A system for controlling an internal combustion engine that includes a turbo charger with a Variable Turbine Geometry for powering a motor vehicle that is provided with a gear box, the system comprising at least one control unit that is configured and operable to:
   determine an effective flow area for the Variable Turbine Geometry,
   determine a maximally allowed closed position for the Variable Turbine Geometry from the determined effective flow area of the Variable Turbine Geometry,
   detect that a shifting of a gear of the motor vehicle is initiated, and
   control the Variable Turbine Geometry to the maximally allowed closed position when the shifting of the gear is detected.

7. The system according to claim 6, wherein the at least one control unit is further configured and operable to:
   store a map of Variable Turbine Geometry positions, wherein the Variable Turbine Geometry positions have flow areas of varying effectiveness,
   determine the maximally closed Variable Turbine Geometry position to a position in the map that corresponds to a particular effective flow area.

8. The system according to claim 7, wherein the at least one control unit is further configured and operable to subsequently determine a different maximally allowed closed position for the Variable Turbine Geometry during the shifting of the gear.

9. The system according to claim 8, wherein the subsequent determining of a different maximally allowed closed position for the Variable Turbine Geometry occurs repeatedly.

10. The system according to claim 6, wherein the shifting of the gear is an up-gear shift.

11. A non-transitory computer readable storage medium storing a computer program product for controlling an internal combustion engine that includes a turbo charger with a Variable Geometry Turbine for powering a motor vehicle that is provided with a gear box wherein the computer program product comprises program segments that when executed on a computer for controlling the internal combustion engine causes the computer to perform the steps of:
- determining an effective flow area for the Variable Turbine Geometry,
- determining a maximally allowed closed position for the Variable Turbine Geometry from the determined effective flow area of the Variable Turbine Geometry,
- detecting that a shifting of a gear of the motor vehicle is initiated, and
- controlling the Variable Turbine Geometry to the maximally allowed closed position when the shifting of the gear is detected.

12. The non-transitory computer readable storage medium storing the computer program product according to claim 11 further comprising program segments for:
- storing a map of Variable Turbine Geometry positions, wherein the Variable Turbine Geometry positions have flow areas of varying effectiveness,
- determining the maximally closed Variable Turbine Geometry position to a position in the map that corresponds to a particular effective flow area.

13. The non-transitory computer readable storage medium storing the computer program product according to claim 11, further comprising program segments for updating the maximally allowed closed position for the Variable Turbine Geometry during the shifting of the gear.

14. The non-transitory computer readable storage medium storing the computer program product according to claim 13, wherein the subsequent determining of a different maximally allowed closed position for the Variable Turbine Geometry occurs repeatedly.

15. The non-transitory computer readable storage medium storing the computer program product according to claim 11 wherein the shifting of the gear is an up-gear shift.

* * * * *

UNITED STATES PATENT AND TRADEMARK OFFICE
CERTIFICATE OF CORRECTION

PATENT NO. : 8,478,505 B2  
APPLICATION NO. : 12/599739  
DATED : July 2, 2013  
INVENTOR(S) : Swartling et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this
Eighth Day of September, 2015

Michelle K. Lee
*Director of the United States Patent and Trademark Office*